Dec. 13, 1966 M. G. BAYS 3,291,249
VIBRATION ISOLATION DEVICE
Filed March 16, 1964
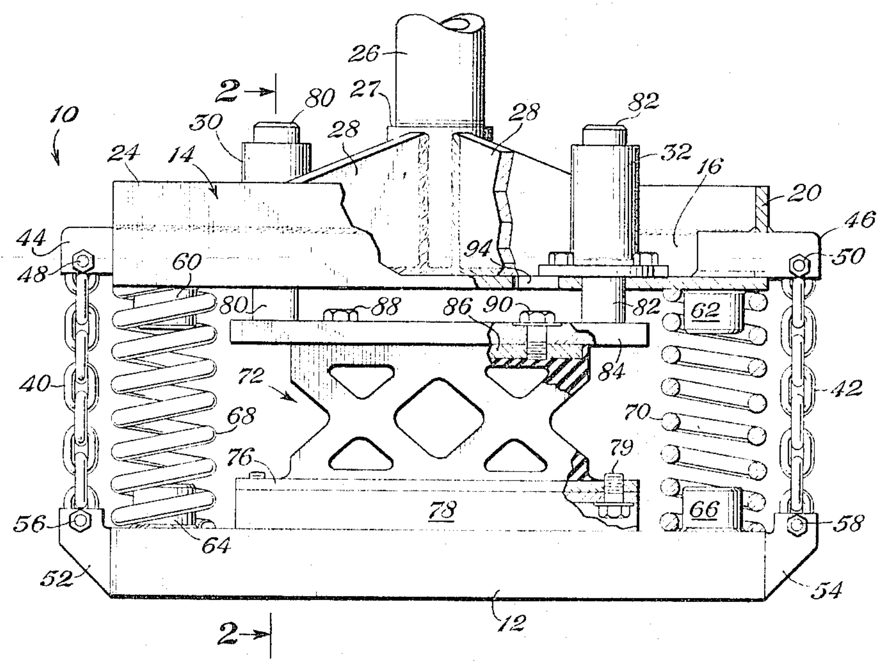
Fig. 1
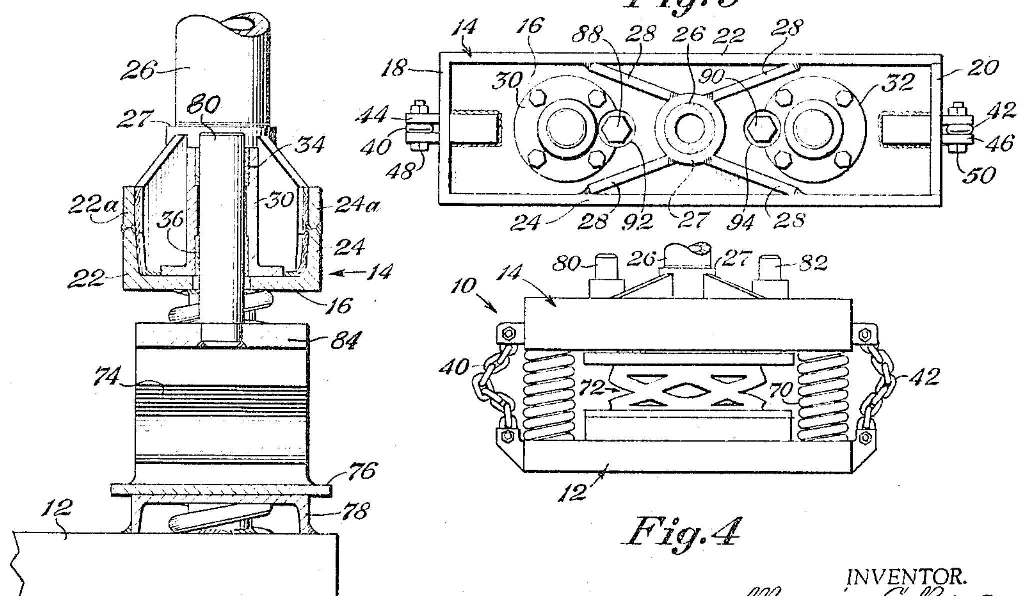
Fig. 3
Fig. 4
Fig. 2
INVENTOR.
Marvin G. Bays
BY William J. Miller
Attorney 3,291,249
Patented Dec. 13, 1966

3,291,249

VIBRATION ISOLATION DEVICE

Marvin G. Bays, Ponca City, Okla., assignor to Continental Oil Company, Ponca City, Okla., a corporation of Oklahoma Filed Mar. 16, 1964, Ser. No. 352,027
3 Claims. (Cl. 181—.5)

The present invention relates generally to the art of vibration isolation, and more particularly, but not by way of limitation, relates to an improved vibration isolation device for applying the weight of a transporting truck to the baseplate of a seismic transducer to hold the baseplate against the ground while isolating the motion of the baseplate from the truck or, alternatively, for lifting the baseplate and transducer for transport by the truck.

Present day techniques for seismic surveying often employ a vibrator or seismic transducer for generating seismic signals in the earth. These transducers generally comprise a baseplate for engaging the surface of the earth, a reaction mass of from several hundred to several thousand pounds, and a suitable linear actuator, usually hydraulic, for reciprocating the reaction mass relative to the baseplate at a predetermined frequency. The resulting reaction force reciprocates the baseplate through a short vertical stroke at a corresponding frequency to induce the desired seismic signal in the earth.

It is very important for the baseplate to be in contact, i.e., coupled to the ground, during generation of the entire seismic signal. Otherwise the seismic signal will be distorted and will be unsatisfactory for geophysical purposes, and the transducer may be damaged. It is customary to transport these transducers by a vehicle of some type, preferably a standard truck, and to use the weight of the vehicle to hold the baseplate against the ground. This is usually accomplished by suitable vertical posts on the truck which may be hydraulically raised and lowered to press the baseplate against the ground or to raise the baseplate for transport. The posts are connected to the baseplate of the transducer by a suitable isolation means which includes some spring or cushion means for applying the static load of the truck to the baseplate while isolating the vibration of the baseplate from the truck, and some tension means for lifting the baseplate when the vertical posts are raised.

In general it is necessary to apply a hold down force to the baseplate which is approximately 1.5 times as great as the maximum upward force exerted on the baseplate during operation of the transducer without appreciably interfering with the motion of the baseplate nor transmitting appreciable vibration to the truck. Since it is desirable to generate as much seismic energy as possible with the transducer and this results in high forces on the baseplate, it is desirable to apply substantially the entire weight of the transporting vehicle, usually 20,000 pounds or more, as a static load to hold the baseplate against the ground.

It is also highly desirable to generate some seismic energy having frequencies below 10 cycles per second. This materially complicates the design of a suitable isolation system. In order to be effective, the vibration isolation system must have a low natural frequency of vibration $f_n$ compared to the forced frequency of vibration $f_f$ of the baseplate. In transducer systems of the type described, the natural frequency $f_n$ of the spring-mass system, which is comprised of the truck mass and the isolation system, may be expressed by the equation:

$$f_n = \frac{1}{2\pi}\left[\frac{g}{d}\right]^{1/2}$$

where $f_n$ is the natural frequency in cycles per second, g. is gravity expressed in inches per second per second, and $d$ is the inches of static deflection of the spring system by the static load of the truck. Thus it will be evident that a high static deflection is necessary in order to obtain a natural frequency value $f_n$ that is appreciably below 10. Accordingly, the spring system must have a high deflection, yet support a heavy load.

From the above it should be evident that a spring of infinite length infinitely deflected would provide the theoretically ideal system. However, in practice, this is not possible due to the fact that the vibration isolation system is the only link between the truck and the transducer and accordingly must provide the entire the lateral support necessary to hold the truck over the baseplate. The lateral forces exerted on the isolation system are frequently very high due to the fact that the rear wheels of the truck are customarily lifted off the ground and it is not uncommon to operate the transducer on ground having a slope as high as 15°.

The present invention contemplates an improved vibration isolation system particularly adapted for use in connection with seismic transducers which will support a high load, will effectively isolate frequencies below 10 c.p.s., and will provide the necessary lateral stability to maintain the truck substantially centered over the transducer. Without intending to limit the invention at this point, the novel isolation device, when adapted for use in connection with a transducer of the type heretofore described is comprised generally of an elongated member disposed parallel to the baseplate. A relatively long first spring means having a relatively low spring constant and therefore a low natural frequency is disposed between the elongated member and the baseplate. A second bulk spring means having a much higher spring constant, and therefore higher natural frequency, and also having considerable lateral strength against deflection is also disposed between the elongated member and the baseplate. The second bulk spring means interconnects the elongated member and the baseplate in such a manner that when the two spring means are loaded, lateral movement of the elongated member relative to the baseplate will be checked by the second spring means, yet the movement will be isolated from and will not interfere with the motion of the baseplate. Suitable tension members also interconnect the elongated member and the baseplate so that the baseplate can be raised from the ground for transport by the truck by raising the elongated member.

More specifically, the invention contemplates that the first spring means will comprise a pair of coil springs and the second spring means will comprise a body, such as rubber or the like, of resilient material rigidly connected to the baseplate and having pin members extending through and slidably received within apertures in the elongated member. Various other more specific aspects of the invention are hereafter described in detail in the following specification of a preferred embodiment and are particularly pointed out in the appended claims.

Therefore, an important object of the present invention is to improved vibration isolation device.

Another object of the invention is to provide an isolation device which may be used as a linkage means between the baseplate of a seismic transducer and a transporting truck as previously described.

Another object of the invention is to provide a vibration isolation device of the type described which will more effectively isolate low frequencies.

Yet another object of the invention is to provide an isolation system of the type described which will resist and isolate high lateral forces.

A still further object of the invention is to provide a vibration isolation device of the type described which may be used to lift the transducer without damaging the spring means by excessive tensile stresses.

Yet another object of the invention is to provide a device of the type described which permits a seismic transducer to be operated on sloping ground or under high lateral forces without excessive danger of damaging the device or disrupting the seismic signal being generated.

Many additional objects and advantages of this invention will be evident to those skilled in the art from the following detailed description and drawings, wherein:

FIGURE 1 is a side elevation of an isolation device constructed in accordance with the present invention with portions of the device broken away to better illustrate details of construction;

FIGURE 2 is a sectional view taken substantially on lines 2—2 of FIGURE 1;

FIGURE 3 is a top view of the device of FIGURE 1; and

FIGURE 4 is a somewhat simplified side elevational view of the device of FIGURE 1 illustrating the device under a static load.

Referring now to the drawings, a vibration isolation device constructed in accordance with the present invention is indicated generally by the reference numeral 10. The isolation device 10 is illustrated in combination with the baseplate 12 of a seismic transducer of the general type previously described. An isolation device will usually be disposed transversely across each end of the baseplate 12 of the transducer and substantially equal loads applied to the two devices in order to securely hold the baseplate against the earth as previously described. Thus the transverse width of the baseplate 12 may be considered as an elongated member for purposes of describing the isolation device 10.

Another elongated member 14 is spaced from and disposed generally parallel to the baseplate member 12. The elongated member 14 may conveniently be comprised of a channel member 16. End flanges 18 and 20 may be welded to the channel member 16 for stiffening purposes. Side stiffening flanges 22 and 24 are formed by the standard flanges of the channel 16 which are extended by strips 22*a* and 24*a* welded to the channel flanges.

A vertically disposed post 26 having a threaded lower end (not illustrated) is connected to the channel 16 by a collar 27 which is welded to the web of the channel and is braced by four gusset plates 28 which are welded to the post collar 27, to the web of the channel 16, and to the flanges 22 and 24 as can best be seen in FIGURE 3. The flanges of a pair of sleeves 30 and 32 are bolted to the web of the channel 16. The sleeves 30 and 32 may be provided with suitable sleeve type bearings, such as illustrated at 34 and 36 in FIGURE 2. The web of the channel 16 is provided with apertures aligned with the sleeves 30 and 32 for receiving pins which will presently be described.

The elongated member 14 is held within a predetermined maximum distance from the baseplate 12 by a pair of tension members 40 and 42 which may conveniently be comprised of conventional link chains. The chains may be connected to the elongated member 14 by shackles 44 and 46 which pass through the end plates 18 and 20 respectively and are welded to the web of the channel 16. Suitable bolts 48 and 50 interconnect the shackles and the upper ends of the tension members 40 and 42. Similar shackles 52 and 54 are connected to the edges of the baseplate 12 and are connected to the lower ends of the chains 40 and 42 by bolts 56 and 58, respectively. Thus the tension members 40 and 42 provide a tension link between the elongated member 14 and the baseplate 12 such that the baseplate can be raised by raising the vertical post 26.

A pair of spaced stubs 60 and 62 are connected to the bottom of the web of the channel 16 and extend downwardly therefrom. A similar pair of stubs 64 and 66 are connected to the upper face of the baseplate 12 and aligned with the respective stubs 60 and 62. A first coil spring 68 extends between the elongated member 14 and the baseplate 12 and encircles the opposed stubs 60 and 64. A similar coil spring 70 extends between the elongated member 14 and the baseplate 12 and encircles the opposed stubs 62 and 66. The coil springs 68 and 70 have a relatively low spring constant and therefore a relatively low natural frequency for purposes which will presently be described in greater detail. The springs 68 and 70 preferably have an uncompressed length greater than that of the tension members 40 and 42 and are therefore precompressed or preloaded even when the tension members 40 and 42 are taut.

A second bulk spring means indicated generally by the reference numeral 72 is comprised of a body of resilient material 74 which has a relatively high spring constant and therefore a relatively high natural frequency when compared to the coil springs 68 and 70. The body of material 74 may conveniently be comprised of synthetic or natural rubber, or some similar material, and preferably as a configuration substantially as illustrated in FIGURE 1 when uncompressed. It will be noted that the body of material 74 has a length and height as viewed in FIGURE 1, and a width and height as viewed in FIGURE 2. A series of passageways extend transversely through the body to form a lattice-like structure having a pair of X-shaped members when viewed from the side as in FIGURE 1. This material is commercially available and does not, per se, comprise a part of the present invention. This body configuration has excellent lateral stability in that it resists and isolates forces acting in the plane disposed generally parallel to the baseplate 12. However, the body is considerably more resilient in the direction normal to the baseplate 12 due to the X-shaped lattice configuration. The bulk spring means 72 is rigidly connected to the baseplate 12. This is accomplished by bonding the body of resilient material 74 to the plate 76 which in turn is connected to the web of an inverted channel 78 by bolts 79. The flanges of the channel 78 are then welded to the baseplate 12 as can best be seen in FIGURE 2. A pair of pin members 80 and 82 are connected to the top of the spring means 72 and extend through the bearing sleeves 30 and 32, respectively. The ends of the pins 80 and 82 are welded to a plate 84. The plate 84 is connected to a plate 86 which is embedded in and bonded to the body of resilient material 74 by suitable bolts 88 and 90. A pair of apertures 92 and 94, as can be seen in FIGURE 3, are provided to accommodate the heads of the bolts 88 and 90, respectively, when a load is applied to the isolation device 10 and the elongated member contacts the plate 84 as will presently be described.

In operation, a static load is applied to the baseplate 12 of the transducer by applying a portion of the weight of the transporting truck to the upright post 26. The load is transmitted through the device 10 and compresses the coil springs 68 and 70 until the device assumes substantially the position illustrated in FIGURE 4. As the coil springs are compressed, the bearing sleeves 30 and 32 slide down over the pins 80 and 82 until the lower face of the elongated member 14 contacts the upper face of the plate 84. Both the coil springs 68 and 70 and the bulk spring means 72 are then further compressed until the total load applied to the vertical post 26 is supported. At this point, the tension members 40 and 42 become quite loose and therefore do not interfere with the motion of the baseplate 12 during operation of the seismic transducer.

As previously mentioned, the isolation devices 10 disposed at each end of the baseplate 12 provide the only means interconnecting the vehicle and the transducer. Therefore, the isolation devices 10 provide the sole support for the truck when the truck is lifted from the ground to load the baseplate. Accordingly, the isolation device 10 must resist all lateral force in order to maintain the truck in position over the transducer. The lateral forces become quite large when the baseplate 12 is positioned on sloping ground, whether sloping transversely of the vehicle, longitudinally of the vehicle, or both. The coil springs 68 and 70 offer no resistance to lateral force. However, the bulk spring means 72 provides a very high degree of resistance to these lateral forces and thereby provides the necessary lateral stability for the device. The lateral forces are transmitted to the bulk springs means by the vertically sliding connection between the elongated plate member 14 and the plate 12. The sliding connection is comprised of the pins 80 and 82 which are slidably received in the sleeves 30 and 32. This sliding connection permits the coil springs 68 and 70 to be relatively long and have a relatively low spring constant, and permits the large degree of deflection necessary to produce an isolation device having a low natural frequency. The sliding connection permits the tension members 40 and 42 to be considerably longer without damaging the bulk spring and thereby insures that the tension members 40 and 42 will always be loose during operation of the device. In this regard, it will be appreciated that the elongated member 14 will frequently be displaced laterally from its position over the baseplate 12 particularly when operating on a sloping surface. Then as the baseplate 12 oscillates downwardly, the tension members 40 and 42 are more likely to become taut and transmit a large portion of the force acting on the baseplate to the elongated member 14 and to the truck. However, the slip joint between the pins and the sleeves permits the tension members to be of considerable length without applying a harmful tension force to the elastic body 74 so that the tension members will always be loose when the isolation device is loaded.

Another important aspect of the novel combination of the two types of spring means is that the coil springs 68 and 70 provide the necessary low frequency characteristics while the bulk spring means 72 provides the necessary lateral stability. For example, in one embodiment of the isolation means 10 the coil springs 68 and 70 had a springs constant of 1000 pounds per inch of deflection and the bulk spring means 72 had a spring constant of 6000 pounds per inch of deflection. The coil springs 68 and 70 were precompressed one inch by the tension members 40 and 42. When the isolation device 10 was statically loaded to 20,000 pounds, the coil springs 68 and 70 had a total deflection of 3.5 inches and supported 14,000 pounds of the load. The bulk spring means 72 was deflected one inch and supported 6000 pounds. The natural frequency of the spring mass system under these conditions is approximately three cycles per second so that force frequencies considerably less than 10 cycles per second can be induced in the baseplate 12 without transmitting an unacceptably high portion of these vibrations through the isolation device 10 to the post 26 and subsequently to the truck.

From the above detailed description of a preferred embodiment of the invention, it will be evident that a novel and highly useful isolation device has been described. The isolation device is particularly adapted for use in combination with seismic transducers. The isolation system is sufficiently deflected under load and has sufficient resistance to lateral displacement that it can be operated on slopes up to 15° without danger of the tension means becoming taut and disrupting operation. The isolation device is capable of transmitting high static loads to the baseplate, yet has a very low natural frequency so that the baseplate may be operated at frequencies considerably below 10 cycles per second. The isolation device 10 may also be used to transplant the transducer by reason of the tension means without subjecting the bulk spring means 72 to undue tension forces. The combination of the coil springs 68 and 70 and the bulk spring means 72 provides a device which may be designed to support a wide range of static loads and to have a wide range of natural frequencies. In general, the coil springs 68 and 60 can be made progressively longer and with lower spring constants and natural frequencies to reduce the natural frequency of the entire insulation device 10 because the bulk spring means 72 will provide the necessary lateral stability for the device.

Although a particular embodiment of the present invention has been described in detail, it is to be understood that various changes, substitutions, and alternations can be made therein without departing from the spirit and scope of the invention as defined by the appended claims.

What is claimed is:

1. In combination with a seismic transducer having a baseplate, vibration isolation device for applying the weight of a transporting vehicle as a static load to the baseplate to hold the baseplate against the ground while isolating the motion of the baseplate from the vehicle or, alternatively, for lifting the baseplate and transducer for transport, comprising:

an elongated member spaced from and disposed generally parallel to the baseplate, a pair of flexible tension members interconnecting the ends of the elongated member and the baseplate for maintaining the member within a maximum spacing from the baseplate, a pair of spaced coil springs compressively disposed between the baseplate and the elongated member and contacting each, a bulk spring means connected to the baseplate between the coil springs and between the baseplate and the elongated member, at least one pin means connected to the bulk spring means and extending away from the baseplate, an aperture in the elongated member slidably receiving each of the pin means for transmitting lateral loads on the elongated member to the bulk spring means while permitting movement of the elongated member away from the bulk spring means, and the flexible tension members, the coil springs and the pin means being dimensioned such that when the tension members are taut to lift the baseplate, the pin means will be retained in the respective apertures and the coil springs will be at least slightly compressed, and when both the coil springs and the bulk spring means are compressed, the tension members will be loose to permit vertical movement of the baseplate.

2. In combination with a seismic transducer having a baseplate a vibration isolation device for applying the weight of a transporting vehicle as a static load to the baseplate to hold the baseplate against the ground while isolating the motion of the baseplate from the vehicle or, alternatively, for lifting the baseplate and transducer for transport, comprising;

an elongated member spaced from and disposed generally parallel to the baseplate, a pair of flexible tension members interconnecting the ends of the elongated member and the baseplate, a stub connected to each end of the elongated member and extending downwardly toward the baseplate, a stub aligned opposite each of the stubs on the elongated member and connected to the baseplate and extending upwardly therefrom, a coil spring extending between the baseplate and the elongated member and disposed around each pair of oppositely aligned stubs, a bulk spring means disposed between the coil springs and rigidly connected along one face to the baseplate, a plate connected to an opposite face of the bulk spring means, a pair of pin members connected to the plate and extending in parallel relationship upwardly from the baseplate through the elongated member, and a bearing sleeve slidably receiving each of the pin members and connected to the elongated member.

3. A vibration isolation device as defined in claim 2 wherein the bulk spring means comprises:

a body of resilient material having a length, a width and a height and characterized by passageways extending transversely of the body such that a longitudinal, vertical cross section is characterized by a pair of X-shaped portions.

References Cited by the Examiner

UNITED STATES PATENTS

| | | | |
|---|---|---|---|
| 2,687,269 | 8/1954 | Titus et al. | 248—24 |
| 2,908,456 | 10/1959 | Gertel | 248—24 |
| 3,024,861 | 3/1962 | Clynch | 181—.5 |
| 3,191,896 | 6/1965 | Nathan | 248—22 |

SAMUEL FEINBERG, *Primary Examiner.*

BENJAMIN A. BORCHELT, *Examiner.*

G. H. GLANZMAN, *Assistant Examiner.*